United States Patent [19]
Hakel

[11] Patent Number: 5,094,312
[45] Date of Patent: Mar. 10, 1992

[54] HYDRAULIC CYLINDER FOR STEERING AXLE

[75] Inventor: Roy J. Hakel, Ft. Wayne, Ind.
[73] Assignee: Dana Corporation, Toledo, Ohio
[21] Appl. No.: 634,681
[22] Filed: Dec. 27, 1990
[51] Int. Cl.$^5$ ............................................. B62D 5/06
[52] U.S. Cl. .............................. 180/132; 74/388 PS; 180/136; 180/148; 280/89
[58] Field of Search ................. 280/95.1, 89, 272; 92/13.5; 180/132, 136, 148; 74/388 PS

[56] References Cited

U.S. PATENT DOCUMENTS

| | | | |
|---|---|---|---|
| 1,879,763 | 9/1932 | Overton | 417/491 |
| 2,223,223 | 11/1940 | Muller | 92/13.5 |
| 2,800,885 | 7/1957 | Panissidi | 91/30 |
| 2,922,397 | 1/1960 | Haanes | 91/26 |
| 3,094,254 | 6/1963 | Cullen et al. | 222/504 |
| 3,104,592 | 9/1963 | Sheesley | 92/13.5 |
| 3,156,160 | 11/1964 | Meyer et al. | 92/13.6 |
| 3,935,917 | 2/1976 | Eley et al. | 180/132 |
| 4,527,465 | 7/1985 | Yoshida et al. | 180/148 |
| 4,536,003 | 8/1985 | Maurer et al. | 280/95.1 |
| 4,676,335 | 6/1987 | Adams | 180/132 |
| 5,014,598 | 5/1991 | Champagne | 92/13.5 |

*Primary Examiner*—Kenneth R. Rice
*Attorney, Agent, or Firm*—MacMillan, Sobanski & Todd

[57] ABSTRACT

A hydraulic cylinder assembly for a steering axle includes a cylinder having a piston disposed therein for selective axial movement. The piston is connected to a steering rod which extends outwardly from the ends of the cylinder. The ends of the steering rod are connected through links to respective knuckle assemblies pivotably mounted on the ends of the steering axle. Movement of the piston within the cylinder causes corresponding axial movement of the steering rod and pivoting of the knuckle assemblies to effect steering. A pair of piston stops are disposed within the cylinder at the ends thereof for limiting the axial movement of the piston. The piston stops are generally annular in shape, having one or more radially inwardly deformed portions provided therein. The deformed portions facilitate the installation of the piston stops into the cylinder during assembly. The axial lengths of the piston stops determine the desired limits for the axial movement of the piston within the cylinder. During assembly of the steering axle, the piston stops are selected from a plurality of piston stops having different axial lengths so that the limits of axial movement of the piston within the cylinder can be quickly and easily determined.

17 Claims, 2 Drawing Sheets

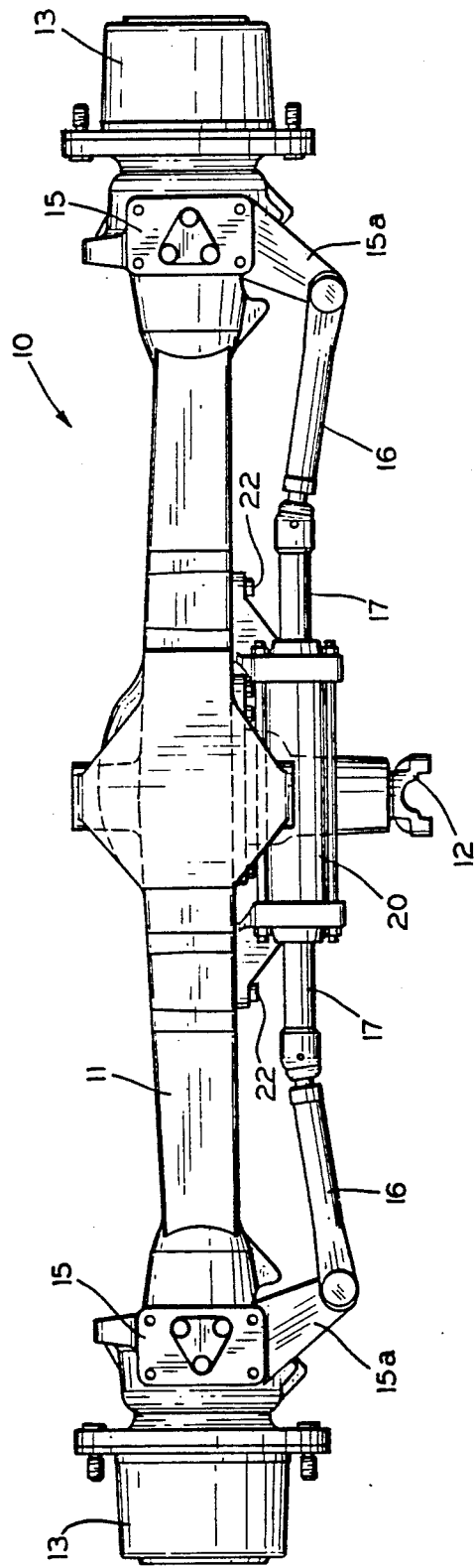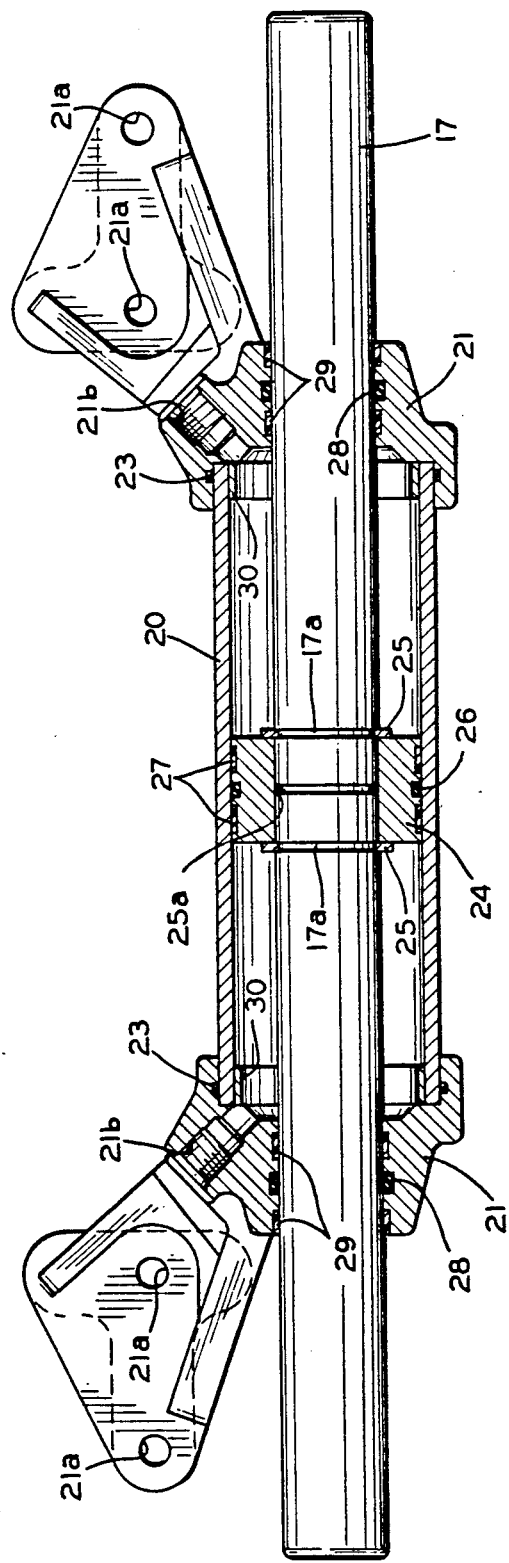

HYDRAULIC CYLINDER FOR STEERING AXLE

BACKGROUND OF THE INVENTION

This invention relates in general to steering axles for vehicles and in particular to an improved hydraulic cylinder assembly for use with such a steering axle.

Wheeled vehicles are typically provided with axles for supporting the vehicle frame on a plurality of rotatable wheels. Such axles usually include a fixed housing secured to the vehicle frame and a pair of wheel hubs rotatably carried on the housing. In some axles, the wheel hubs are free wheeling, i.e., not connected to any source of rotational power. In other axles, the wheel hubs are rotatably driven by an engine connected thereto by a plurality of drive train components. In either type of axle, however, it may further be desirable to support the wheel hubs for pivoting movement relative to the axle. This pivoting movement permits the wheel hubs to steer the vehicle in desired directions. Axles of this type are commonly referred to as steering axles.

Many different structures are known for controlling the pivoting movement of the wheel hubs in steering axles. One common structure involves the use of a hydraulic cylinder secured to the axle housing. A piston is disposed within the cylinder for selective axial movement in response to the application of pressurized fluid therein. A steering rod is connected to the piston and extends out the ends of the cylinder. The ends of the steering rod are connected to the wheel hubs such that axial movement of the piston causes pivoting movement of the wheel hubs, thus effecting steering of the vehicle.

For the sake of economy, it is desirable that a single basic steering axle structure be adaptable for use in a plurality of different vehicles. Unfortunately, different vehicles usually have different steering requirements. For example, some vehicles may require a larger range of pivoting movement for the wheel hubs than others. Although hydraulically driven steering axles can and have been used in different vehicles, it has been found to be inconvenient to define the limits of axial movement of the piston within the cylinder to accommodate these different steering requirements. Thus, it would be desirable to provide such a hydraulically actuated steering axle with a means for quickly and easily defining the limits of axial movement of the piston within the cylinder to accommodate the varying steering requirements of different vehicles.

SUMMARY OF THE INVENTION

This invention relates to an improved hydraulic cylinder assembly for use with a steering axle. The assembly includes a cylinder having a piston disposed therein for selective axial movement. The piston is connected to a steering rod which extends outwardly from the ends of the cylinder. The ends of the steering rod are connected through links to respective knuckle assemblies pivotably mounted on the ends of the steering axle. Movement of the piston within the cylinder causes corresponding axial movement of the steering rod and, as a result pivoting of the knuckle assemblies to effect steering. A pair of piston stops are disposed within the cylinder at the ends thereof for limiting the axial movement of the piston. The piston stops are generally hollow and cylindrical in shape, having one or more radially inwardly deformed portions provided therein. The deformed portions facilitate the installation of the piston stops into the cylinder during assembly.

The axial lengths of the piston stops determine the desired limits for the axial movement of the piston within the cylinder. During assembly of the steering axle, the piston stops are selected from a plurality of piston stops having different axial lengths. In this manner, the limits of axial movement of the piston within the cylinder (and, thus, the angle at which the knuckle assemblies can be pivoted) can be quickly and easily determined for the steering assembly. Consequently, a single basic steering axle structure can efficiently accommodate the varying steering requirements of different vehicles.

It is an object of this invention to provide an improved hydraulic cylinder assembly for use with a steering axle.

It is another object of this invention to provide such an improved hydraulic cylinder assembly having piston stops which are easily insertable within the cylinder to determine the desired limits for the axial movement of the piston within the cylinder.

It is a further object of this invention to provide such an improved hydraulic cylinder assembly which can be quickly and easily adjusted to accommodate the varying steering requirements of different vehicles.

Other objects and advantages of this invention will become apparent to those skilled in the art from the following detailed description of the preferred embodiment, when read in light of the accompanying drawings.

BRIEF DESCRIPTION OF THE DRAWINGS

FIG. 1 is a top plan view of a vehicle steering axle including a hydraulic cylinder assembly in accordance with this invention.

FIG. 2 is a front elevational view, partially broken away, of the hydraulic cylinder assembly illustrated in FIG. 1.

DETAILED DESCRIPTION OF THE PREFERRED EMBODIMENT

Figure 3:
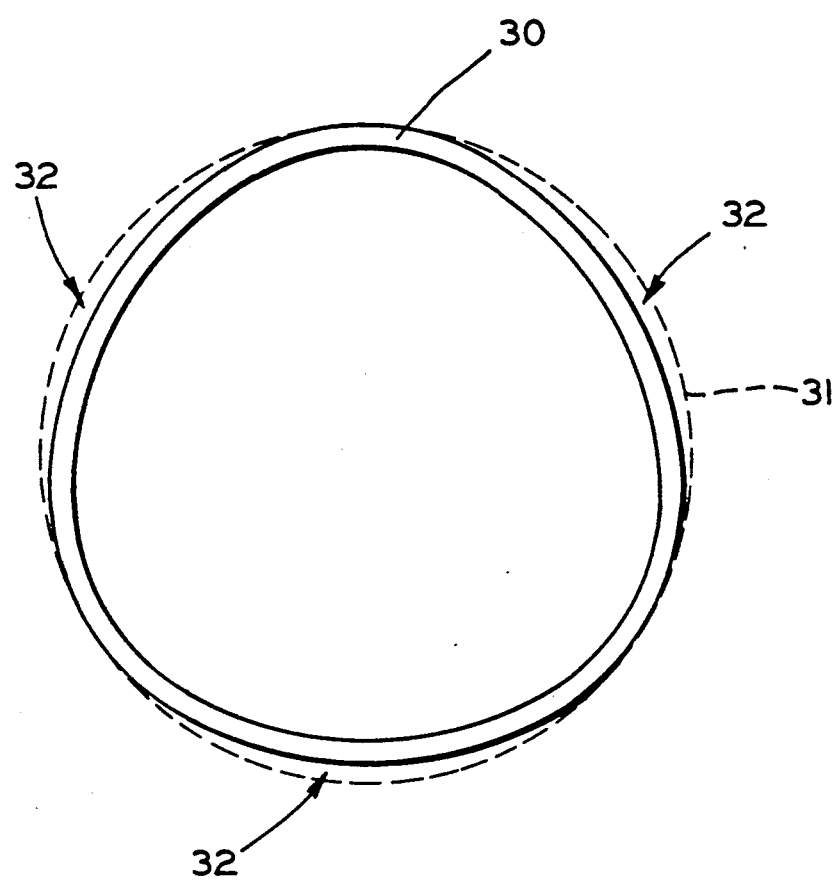
FIG. 3 is an end elevational view of one of the piston stops illustrated in FIG. 2.

Referring now to the drawings, there is illustrated in FIG. 1 a steering axle, indicated generally at 10, for a vehicle. The steering axle 10 includes a housing 11 having a rearwardly extending yoke 12 journalled therein for rotation. The yoke 12 is connected to a conventional differential gear assembly (not shown) enclosed in an enlarged central portion of the housing 11. A pair of axle shafts (not shown) extend outwardly from the differential through the housing 11 to opposed wheel hubs 13 rotatably supported on the ends of the housing 11. As is well known in the art, rotation of the yoke 12 by an engine (not shown) of the vehicle causes corresponding rotation of the axle shafts and the wheel hubs 13. The differential permits the two axle shafts to rotate relative to one another under certain driving conditions in a known manner.

The wheel hubs 13 are mounted on respective knuckle assemblies 15 pivotably connected to the ends of the steering axle housing 11 by conventional kingpins (not shown) or similar means. Thus, the wheel hubs 13 can be pivoted relative to the axle housing 11 for the purpose of steering the vehicle. To control such pivoting movement, each of the knuckle assemblies 15 is provided with a rearwardly extending steering arm portion 15a. The steering arm portions 15a are pivotably connected to the outer ends of respective links 16. The inner ends of the links 16 are pivotably connected to the outer ends of a steering rod 17. Axial movement of the steering rod 17 causes coordinated pivoting movement of both of the knuckle assemblies 15 and, therefore, the wheel hubs 13. The components of the steering axle 10 thus far described are conventional in the art.

A hydraulic cylinder 20 is provided for controlling the axial movement of the steering rod 17. As best shown in FIG. 2, the cylinder 20 is hollow and cylindrical in shape, having both ends open. The ends of the cylinder 20 are received in respective cylindrical recesses formed in support brackets 21. Apertures 21a are formed in end portions of the support brackets 21 for receiving threaded fasteners 22 (see FIG. 1). The threaded fasteners 22 rigidly secure the support brackets 21 and, therefore, the cylinder 20 to the central portion of the axle housing 11. The support brackets 21 have respective passageways 21b formed therein which communicate with the interior of the cylinder 20. The passageways 21b are connected to a source of pressurized hydraulic fluid (not shown), for a purpose which will be explained in detail below. O-rings 23 are provided between the outer ends of the cylinder 20 and the support brackets 21 to prevent hydraulic fluid from leaking from the interior of the cylinder 20.

The steering rod 17 extends completely through the cylinder 20 and through respective cylindrical openings formed through the support brackets 21. A piston 24 is disposed within the cylinder 20 so as to divide the interior thereof into two chambers. The passageways 21b communicate with these chambers. The piston 24 is attached to the steering rod 17 by snap rings 25 disposed in respective grooves 17a formed in the outer surface of the steering rod 17. An O-ring 25a is provided between the piston 24 and the steering rod 17 to seal the two chambers from one another. A seal 26 is provided between the outer surface of the piston 24 and the inner surface of the cylinder 20 to prevent hydraulic fluid from leaking from the one of the internal chambers to the other. Guide rings 27 are also provided on the outer surface of the piston 24 for facilitating axial sliding movement within the cylinder 20. Similar seals 28 and guide rings 29 are provided between the support brackets 21 and the steering rod 17.

When it is desired to pivot the knuckle assemblies 15 and the wheel hubs 13 as described above, pressurized fluid is supplied into one of the chambers through its associated passageway 21b, while the other chamber is vented through its associated passageway 21b. The resulting pressure differential across the piston 24 causes it to slide axially within the cylinder 20. Because the piston 24 is attached to the steering rod 17, the steering rod 17 is also moved axially. Thus, the knuckle assemblies 15 and the wheel hubs 13 are pivoted relative to the axle housing 11 to effect steering as described above. The means for supplying pressurized hydraulic fluid to the chambers and for venting same are conventional in the art and form no part of this invention.

Means are provided for limiting the length of axial movement of the piston 24 within the cylinder 20. In the illustrated embodiment, piston stops 30 are disposed within the ends of the cylinder 20 adjacent to the support brackets 21. As shown in FIG. 2, the piston stops 30 abut respective shoulders formed on the support brackets 21. When the piston 24 is moved a sufficient distance within the cylinder 20, it abuts one of the piston stops 30 which, in turn, abuts the associated shoulder formed on the support bracket 21. As a result, further movement of the piston 24 in that direction is prevented. Since the axial movement of the piston 24 controls the pivoting movement of the wheel hubs 13, the piston stops 30 also function to limit the angle at which the wheel hubs 13 may be pivoted during steering.

The structure of one of the piston stops 30 is illustrated in detail in FIG. 3. As shown therein, the piston stop 30 is generally annular in shape, defining the circumference of a circle indicated in dotted lines at 31. This circle preferably has an outer diameter which is slightly larger than the diameter defined by the inner surface of the cylinder 20. However, portions (indicated generally at 32) of the piston stop 30 are slightly deformed radially inwardly from that circle 31. In the illustrated embodiment, three of such deformed portions 32 are provided, although more or less may be formed as desired. The depths of these deformed portions 32 is preferably relatively small in comparison to the diameter of the circle 31. However, if desired, the depths of such deformed portions 32 may be increased.

The deformed portions 32 are provided in the piston stops 30 to facilitate the installation thereof into the cylinder 20. A tool (not shown) can be used to compress the deformed portions 32 radially inwardly, thus decreasing the overall diameter of the piston stop 30 to slightly less than the inner diameter of the cylinder 20. Then, the piston stop 30 can be easily inserted within the cylinder 20. When the tool is removed, the overall diameter of the piston stop 30 increases such that it frictionally engages the inner surface of the cylinder 20. In this manner, the piston stops 30 are maintained in position within the ends of the cylinder 20. The frictional engagement between the piston stops 30 and the cylinder 20 is preferably relatively light, enough only to prevent the piston stops 30 from sliding within the cylinder 20 during use.

In operation, the piston 24 is moved axially back and forth within the cylinder 20 in response to the application of pressurized hydraulic fluid to control the pivoting movement of the wheel hubs 13. This axial movement of the piston 24 is limited by the piston stops 30 disposed within the ends of the cylinder 20. If it is attempted to move the piston 24 beyond one of the axial limits, the piston 24 will abut the inner end of the associated piston stop 30. Since the outer end of the piston stop 30 is itself in abutting relationship with the shoulder formed on the support bracket 21, further axial movement of the piston 24 is prevented. Thus, it will be appreciated that the axial lengths of the piston stops 30 define the limits of the axial movement of the piston 24.

The axial lengths of the piston stops 30 are selected to accommodate the particular steering requirements of the vehicle in which the steering axle 10 is used. In other words, if the design of a particular vehicle requires certain limits on the pivoting movement of the wheel hubs 13, the axial lengths of the piston stops 30 are selected to accomplish these limits. Since the same basic steering axle structure 10 may be used in different vehicles having different steering requirements, the axial lengths of the piston stops 30 are selected in accordance with those requirements. This selection can be made quickly and easily during assembly of the steering axle 10, when the piston stops 30 are inserted within the cylinder 20 as discussed above. To simplify such assembly, a plurality of piston stops 30 can be provided, each having different axial lengths. By selecting and inserting the appropriately sized piston stops 30 within the cylinder 20 during assembly, the steering axle 10 is quickly and easily adapted for use with a plurality of different vehicles.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A piston stop adapted to be disposed within a cylinder for limiting the movement of a piston therein comprising a generally cylindrical body having a relatively thin wall thickness and at least one radially inwardly deformed portion formed therein.

2. The invention defined in claim 1 wherein a plurality of radially inwardly deformed portions are formed in said body portion.

3. An actuator for effecting axial movement of a rod in response to fluid pressure comprising:
   a cylinder;
   a piston disposed within said cylinder for selective axial movement, the rod being connected to said piston for movement therewith;
   means for selectively supplying fluid pressure within said cylinder to cause axial movement of said piston and the rod; and
   a piston stop disposed within said cylinder at one end thereof for limiting the axial movement of said piston, said piston stop including a generally cylindrical body having a relatively thin wall thickness and at least one radially inwardly deformed portion provided therein, said piston stop being sized to normally frictionally engage said cylinder to prevent relative movement but being deformable to be moved out of frictional engagement with said cylinder.

4. The invention defined in claim 3 wherein a plurality of deformed portions are formed in said piston stop.

5. The invention defined in claim 4 wherein said piston stop is deformed radially inwardly.

6. The invention defined in claim 3 wherein a piston stop is disposed within said cylinder at each end thereof for limiting the axial movement of said piston, each of said piston stops including a generally cylindrical body having a relatively thin wall thickness and at least one radially inwardly deformed portion provided therein.

7. The invention defined in claim 6 wherein a plurality of deformed portions are formed in each of said piston stops.

8. The invention defined in claim 7 wherein each of said piston stops is deformed radially inwardly.

9. A steering axle comprising:
   an axle housing;
   a wheel hub pivotably mounted on said axle housing;
   a cylinder mounted on said axle housing;
   a piston disposed within said cylinder for selective axial movement;
   means for selectively moving said piston within said cylinder;
   means for connecting said piston to said wheel hub such that axial movement of said piston causes pivoting movement of said wheel hub; and
   a piston stop disposed within said cylinder at one end thereof for limiting the axial movement of said piston, said piston stop including a generally cylindrical body having a relatively thin wall thickness and at least one radially inwardly deformed portion provided therein, said piston stop being sized to normally frictionally engage said cylinder to prevent relative movement but being deformable to be moved out of frictional engagement with said cylinder.

10. The invention defined in claim 9 wherein two wheel hubs are mounted on the ends of said axle housing and wherein said means for connecting connects said piston to both of said wheel hubs such that axial movement of said piston causes pivoting movement of said wheel hubs.

11. The invention defined in claim 10 wherein said means for connecting includes a steering rod connected to said piston and extending through the ends of said cylinder.

12. The invention defined in claim 11 wherein said means for connecting further includes links having first ends pivotably connected to ends of said steering rod and second ends pivotably connected to said wheel hubs.

13. The invention defined in claim 9 wherein a plurality of deformed portions are formed in said piston stop.

14. The invention defined in claim 13 wherein said piston stop is deformed radially inwardly.

15. The invention defined in claim 9 wherein a piston stop is disposed within said cylinder at each end thereof for limiting the axial movement of said piston, each of said piston stops including a generally cylindrical body having a relatively thin wall thickness and at least one radially inwardly deformed portion provided therein.

16. The invention defined in claim 15 wherein a plurality of deformed portions are formed in each of said piston stops.

17. The invention defined in claim 16 wherein each of said piston stops is deformed radially inwardly.

* * * * *